Aug. 5, 1952　　　A. R. SCOTT　　　2,605,687
ENCLOSED AUTOMOBILE DASHBOARD

Filed April 9, 1948　　　　　　　　　　　2 SHEETS—SHEET 1

INVENTOR.
Augustus R. Scott
BY
McMorrow, Berman & Davidson
ATTORNEYS

Aug. 5, 1952 A. R. SCOTT 2,605,687
ENCLOSED AUTOMOBILE DASHBOARD
Filed April 9, 1948 2 SHEETS—SHEET 2

INVENTOR.
Augustus R. Scott
BY
McMorrow, Berman & Davidson
ATTORNEYS

Patented Aug. 5, 1952

2,605,687

UNITED STATES PATENT OFFICE 2,605,687

ENCLOSED AUTOMOBILE DASHBOARD

Augustus R. Scott, New Castle, Colo.

Application April 9, 1948, Serial No. 20,055

2 Claims. (Cl. 98—2)

This invention relates to vehicle instrument panels and more particularly to an enclosed instrument panel for automobiles.

A main object of the invention is to provide a novel and improved instrument panel construction for automobiles wherein instruments and accessories ordinarily carried on or mounted adjacent to a conventional instrument panel and dashboard are substantially completely housed, whereby they are protected against the entry of dust and grit and other undesirable foreign substances, and wherein more efficient utilization is made of the space behind the instrument panel than has heretofore been achieved in automobile dashboard structures.

A further object of the invention is to provide an improved automobile enclosed instrument panel construction which is neat in appearance, provides a maximum amount of space forwardly of the front seat of the automobile, and which permits access to all instruments and accessories enclosed in the dashboard from the motor hood compartment of the automobile.

Further objects and advantages of the invention will become apparent from the following description and claims, and from the accompanying drawings, wherein:

Figure 4:
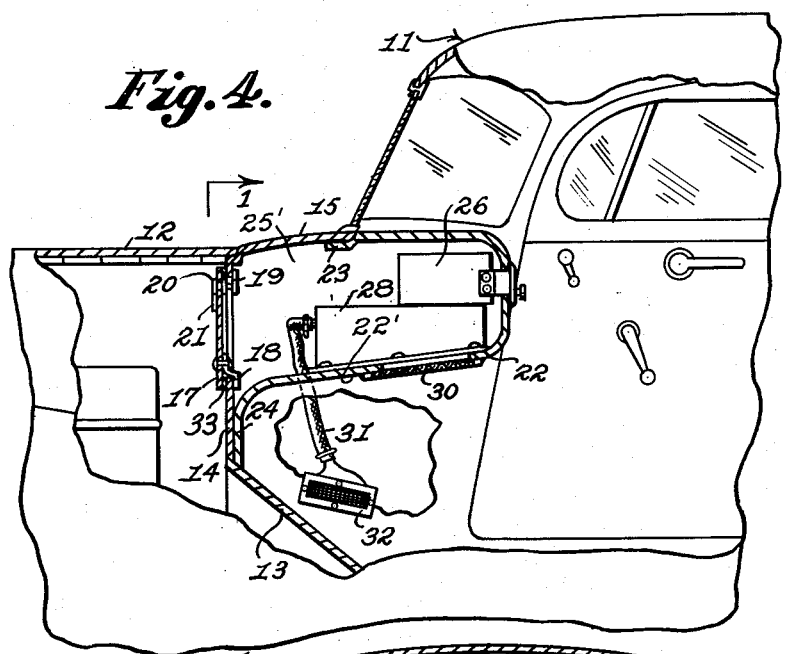
Figure 4 is a side elevational view, partly in cross-section, of the forward portion of an automobile provided with an improved enclosed instrument panel construction according to this invention.

Referring to the drawings, 11 designates an automobile having a motor hood 12 and the usual floor board 13. Designated at 14 is a transverse vertical dashboard or fire wall extending between the forward end of the cowl wall 15 and the floor board 13. The cowl wall 15 extends rearwardly for a substantial distance into the passenger compartment. Wall 14 is formed with a rectangular opening 16 and designated at 17 is a cover panel fitting said opening. Secured to the lower rear marginal portion of panel 17 is an offset depending flange 18 cooperating with the lower marginal portion of panel 17 to receive the lower edge of opening 16 when the plate is in closed position, as shown in Figure 4. The upper intermediate portion of cover plate 17 carries a locking arm 19 operated by an outer hand lever 21 and controlled by a key-actuated lock 20. Arm 19 is engageable behind the upper margin of opening 16 to secure plate 17 in closed position, and by means of lock 20, said arm may be maintained in vertical locking position until released by engaging the proper key in lock 20. It will be noted that cover plate 17 is reached from the motor hood compartment of the automobile.

Figure 1:
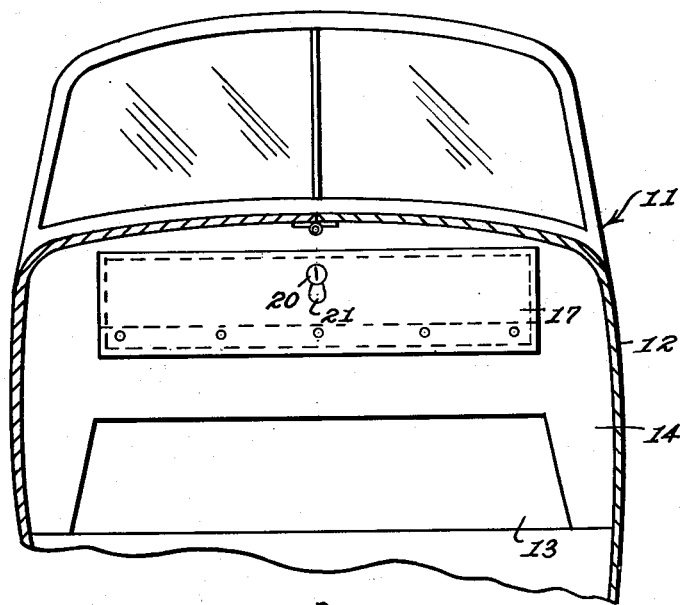
Figure 1 is a transverse vertical cross-sectional view taken through the motor hood of an automobile provided with an improved enclosed instrument panel construction according to the present invention, said view being taken on line 1—1 of Figure 4.
Figure 2:
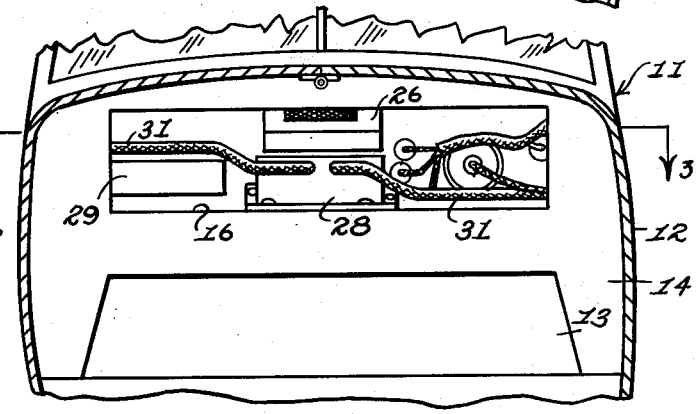
Figure 2 is a view similar to Figure 1 but with the firewall or dashboard opening cover plate removed.
Figure 3:
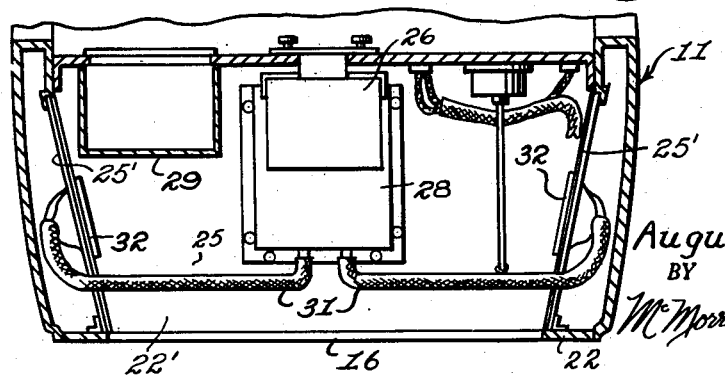
Figure 3 is a horizontal cross-sectional view taken on line 3—3 of Figure 2.
Figure 5:
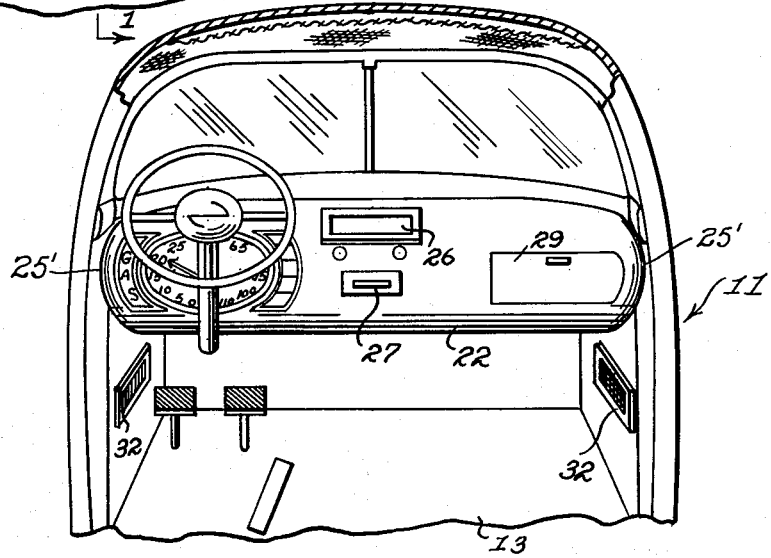
Figure 5 is an elevational view of the instrument panel of Figure 4, viewed from the interior of the automobile.
Figure 6:
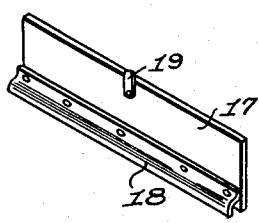
Figure 6 is a rear perspective view of the dashboard opening cover plate employed in the structure of Figure 1.

Designated at 22 is a transversely extending enclosed channel-like instrument panel of sheet metal or the like, secured at its top marginal portion to the rear margin of cowl 15, as shown at 23, the lower part of the panel 22 providing a bottom wall 22' extending forwardly beneath the cowl wall 15. The bottom wall 22' of the panel 22 is formed with a depending vertical flange 24 which is secured to the lower marginal portion of fire wall 14, the panel 22, cowl 15 and firewall 14, thereby defining an enclosure or compartment 25 spaced above floorboard 13, closed at its sides by side walls 25'. Mounted in the compartment are the usual instruments such as the speedometer, fuel gauge, oil pressure gauge, and the like, the instrument dials being carried on the rear wall of said compartment and being visible from the front seat of the automobile, as shown in Figure 5. Also mounted in the compartment are various accessories, such as a radio 26, an ash receptacle 27 and a combination heater and air conditioning unit 28. As shown in Figures 3 and 5, the rear wall of the compartment 25 also carries a glove locker 29 housed in the compartment and accessible from the front seat of the automobile. The controls for radio 26 are likewise accessible, as is the ash receptacle 27.

The lower wall of panel 22 is provided with a screened opening 30 registering with the air intake opening of air conditioning unit 28. Designated at 31, 31 are outlet conduits leading from unit 28 to the side walls of the automobile body and extending through said side walls to air outlet registers 32 mounted in the lower portions of the side wall panels laterally adjacent floor board 13. When the unit 28 is in operation, air is drawn in through opening 30, is heated or otherwise conditioned in the unit, and is exhausted into the space adjacent floor board 13 through the side wall registers 32, 32. It will be seen that no parts of the air conditioning or heating unit are located in the space below dashboard panel 22, and that said space is entirely clear of other items of equipment, whereby maximum leg room is obtained and whereby said space may be easily kept clean.

Whenever it is necessary to service any of the instruments or accessories in the dashboard compartment, access thereto may be had from the motor hood compartment by removing the cover panel 17 as above described.

To seal the dashboard compartment against the entry of moisture, a deformable sealing gasket 33 is interposed between the wall 14 and cover plate 17, said sealing gasket being preferably permanently secured to wall 14 around the margin of opening 16.

While a specific embodiment of an automobile dashboard construction has been disclosed in the foregoing description it will be understood that various modifications within the spirit of the invention may occur to those skilled in the art. Therefore it is intended that no limitations may be placed on the invention except as defined by the scope of the appended claims.

What is claimed is:

1. In a motor vehicle body having a motor compartment and a passenger compartment, a cowl structure separating said motor and passenger compartments comprising a vertical firewall, a top cowl wall extending from the upper end of said firewall for a substantial distance into the passenger compartment, a bottom wall extending from said firewall into said passenger compartment and spaced above the bottom of said passenger compartment, said top and bottom walls extending transversely for a major part of the width of said firewall and of said passenger compartment, a panel wall extending vertically between the ends of said top and bottom walls remote from the firewall and extending transversely between the opposite ends of said top and bottom walls, sidewalls extending vertically between the ends of the top and bottom walls and between the firewall and the ends of the panel wall and forming an enclosed instrument compartment, the said bottom wall being formed with a reticulated air intake opening providing sole communication between said instrument compartment and the interior of said passenger compartment, an air conditioning unit supported within said instrument compartment and spaced from the top wall and sidewalls thereof to provide space in the instrument compartment for instruments mounted on said panel wall, said air conditioning unit being in intake communication with said air intake opening, and a conditioned air outlet conduit leading from said unit and traversing a wall of said instrument compartment and opening into said passenger compartment.

2. In a motor vehicle body having a motor compartment and a passenger compartment, a cowl structure separating said motor and passenger compartments comprising a vertical firewall, a top cowl wall extending from the upper end of said firewall for a substantial distance into the passenger compartment, a bottom wall extending from said firewall into said passenger compartment and spaced above the bottom of said passenger compartment, said top and bottom walls extending transversely for a major part of the width of said firewall and of said passenger compartment, a panel wall extending vertically between the ends of said top and bottom walls remote from the firewall and extending transversely between the opposite ends of said top and bottom walls, sidewalls extending vertically between the ends of the top and bottom walls and between the firewall and the ends of the panel wall and forming an enclosed instrument compartment, the said bottom wall being formed with a reticulated air intake opening providing sole communication between said instrument compartment and the interior of said passenger compartment, an air conditioning unit supported within said instrument compartment and spaced from the top wall and sidewalls thereof to provide space in the instrument compartment for instruments mounted on said panel wall, said air conditioning unit being in intake communication with said air intake opening, and a conditioned air outlet conduit leading from said unit and traversing a wall of said instrument compartment and opening into said passenger compartment on a level below said instrument compartment and at the side of the passenger compartment beneath said instrument compartment.

AUGUSTUS R. SCOTT.

REFERENCES CITED

The following references are of record in the file of this patent:

UNITED STATES PATENTS

| Number | Name | Date |
|---|---|---|
| 2,049,545 | Ostrander | Aug. 4, 1936 |
| 2,115,472 | Sargent | Apr. 26, 1938 |
| 2,133,488 | Stearns | Oct. 18, 1938 |
| 2,146,826 | Knapp | Feb. 14, 1939 |
| 2,242,844 | Baier et al. | May 20, 1941 |
| 2,285,725 | Kneedler | June 9, 1942 |
| 2,336,089 | Gould | Dec. 7, 1943 |
| 2,344,864 | Griswold | Mar. 21, 1944 |

FOREIGN PATENTS

| Number | Country | Date |
|---|---|---|
| 170,273 | Switzerland | Sept. 17, 1934 |
| 216,356 | Great Britain | May 29, 1924 |